(12) United States Patent
Yamamoto et al.

(10) Patent No.: US 6,915,185 B2
(45) Date of Patent: Jul. 5, 2005

(54) POWER SUPPLY SYSTEM

(75) Inventors: Shinichi Yamamoto, Osaka (JP); Junichi Onoue, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 436 days.

(21) Appl. No.: 09/815,683

(22) Filed: Mar. 23, 2001

(65) Prior Publication Data

US 2001/0034569 A1 Oct. 25, 2001

(30) Foreign Application Priority Data

Mar. 24, 2000 (JP) ...................................... 2000-084298

(51) Int. Cl.⁷ .............................................. G01R 21/00
(52) U.S. Cl. ...................... 700/286; 700/295; 322/44
(58) Field of Search ................................ 700/286, 295; 705/26, 27, 16, 17, 1; 322/17, 28, 36, 44

(56) References Cited

U.S. PATENT DOCUMENTS

| 5,752,046 A | * | 5/1998 | Oprescu et al. ............. 713/300 |
| 5,991,670 A | | 11/1999 | Mufford et al. |
| 6,018,690 A | * | 1/2000 | Saito et al. .................. 700/295 |
| 6,175,217 B1 | * | 1/2001 | Da Ponte et al. ............. 322/19 |
| 6,219,623 B1 | * | 4/2001 | Wills ........................... 702/60 |
| 6,504,266 B1 | * | 1/2003 | Ervin ........................... 700/286 |
| 6,598,029 B1 | * | 7/2003 | Johnson et al. ............... 705/37 |
| 6,625,581 B1 | * | 9/2003 | Perkowski .................... 705/27 |

FOREIGN PATENT DOCUMENTS

| JP | 54-025411 | 2/1979 |
| JP | 63045762 | 2/1988 |
| JP | 4075420 | 3/1992 |
| JP | 06-086463 | 3/1994 |
| JP | 7-9813 | 2/1995 |
| JP | 10-094199 | 4/1998 |

* cited by examiner

Primary Examiner—Leo Picard
Assistant Examiner—Charles Kasenge
(74) Attorney, Agent, or Firm—Snell & Wilmer, L.L.P.

(57) ABSTRACT

A power supply system includes a plurality of electric products; a power generation apparatus capable of varying an amount of power generation; and a power control apparatus for controlling power supply from the power generation apparatus to the plurality of electric products. Each of the plurality of electric products is structured to be capable of outputting a first power request signal for requesting a desired amount of power. The power control apparatus receives the plurality of first power request signals respectively from the plurality of electric products, generates a second power request signal for requesting an amount of power which is determined in accordance with a total amount of power requested by the plurality of first power request signals, and outputs the second power request signal to the power generation apparatus. The power generation apparatus increases or decreases the amount of power generation so as to match the amount of power generation with a target amount of power generation which is determined in accordance with the second power request signal.

13 Claims, 14 Drawing Sheets

| State | Power consumption | State signal |
|---|---|---|
| On state | 220W | S1 |
| Off state | 0W | S2 |
| BS recording state | 18W | S3 |

| State | Power consumption | State signal |
|---|---|---|
| Washing by a centrifugal force | 170W | T1 |
| Washing by stirring | 270W | T2 |
| Off state | 0W | T3 |

FIG. 13A

··· WELCOME !
to the home page of the "web site
for electric products usable for
the power supply system". ···

▫ Introduction of electric products
▫ Search for a correspondence table

FIG. 13B

Search for a correspondence table

Name of
the manufacturer

Type of
the electric product

Item number of
the electric product
(model name)

[Search]    [Cancel]

( Back to the home page )

*FIG. 13C*

Confirm the correspondence table

The correspondence table for
Matsushita Electric Industrial Co., Ltd.
Washing machine
××××
is as follows.

| State | Power consumption | State signal |
|---|---|---|
| Washing by a centrifugal force | 170W | T1 |
| Washing by stirring | 270W | T2 |
| Off state | 0W | T3 |

Download   Cancel

Back to the home page

POWER SUPPLY SYSTEM

BACKGROUND OF THE INVENTION

1. Field of the Invention

The current invention relates to a power supply system for supplying power stably while achieving energy savings in, for example, offices and homes.

2. Description of the Related Art

Conventionally known environment-conscious power generation systems include solar energy power generation systems using solar cells and power generation systems using fuel cells.

The solar energy power generation systems are roughly classified into two, i.e., (i) an "independent system" and (ii) an "association system". In the "independent system", an electric energy generated by solar energy power generation is accumulated in a storage cell and then utilized. In the "association system", a solar cell is connected to an electric line of a power company via an inverter. When the amount of power generated by the solar energy generation exceeds the power consumption in a house (for example, daytime on a clear day), the excess amount of the power is purchased by the power company; and when the amount of power generated by the solar energy generation does not reach the power consumption in a house (for example, a rainy day or nighttime), the necessary power is purchased from the power company.

One known example of power generation systems using fuel cells is a home-use co-generation system (see Nikkei Electronics, No. 763, pp. 55–62). The co-generation system described in this document realizes power generation using a fuel cell by providing a polymer-type fuel cell with fuel gas (for example, natural gas or LP gas). The electric energy thus generated is supplied to electric products in houses. The heat discharged from the fuel cell is used for hot water supply or room heating.

The solar cell power generation systems have a problem in terms of effective use of energy. In the "independent system", the generated electric energy is accumulated in a storage cell, and thus an energy loss occurs. In the "association system" also, an energy loss occurs while the excess amount of the power which is sold to the power company is transferred thereto through an electric line.

The co-generation system using a fuel cell is expected to be common in homes and offices. However, it has not been considered how to build a new power supply system appropriate to a fuel cell, specifically, how to stably supply power while achieving energy savings.

SUMMARY OF THE INVENTION

According to one aspect of the invention, a power supply system includes a plurality of electric products; a power generation apparatus capable of varying an amount of power generation; and a power control apparatus for controlling power supply from the power generation apparatus to the plurality of electric products. Each of the plurality of electric products is structured to be capable of outputting a first power request signal for requesting a desired amount of power. The power control apparatus receives the plurality of first power request signals respectively from the plurality of electric products, generates a second power request signal for requesting an amount of power which is determined in accordance with a total amount of power requested by the plurality of first power request signals, and outputs the second power request signal to the power generation apparatus. The power generation apparatus increases or decreases the amount of power generation so as to match the amount of power generation with a target amount of power generation which is determined in accordance with the second power request signal.

In one embodiment of the invention, the power generation apparatus is a fuel cell.

In one embodiment of the invention, the power control apparatus generates the second power request signal so as to fulfill $R=\Sigma Ri+Rm$, where R indicates an amount of power requested by the second power request signal, Ri (i=0, 1, . . . n) indicates an amount of power requested by each of the plurality of first power request signals, and Rm indicates a minimum necessary amount of power for communication between the plurality of electric products and the power control apparatus.

In one embodiment of the invention, the power generation apparatus determines whether or not the amount of power generation matches the target amount of power generation which is determined in accordance with the second power request signal; and when the amount of power generation is determined to match the target amount of power generation. The power generation apparatus outputs a matching signal to the power control apparatus. The power control apparatus outputs an acknowledging signal to each of at least one electric product which outputs the first power request signal among the plurality of electric products, in response to the matching signal.

In one embodiment of the invention, the power generation apparatus determines whether or not the amount of power generation matches the target amount of power generation which is determined in accordance with the second power request signal. When the amount of power generation is determined to match the target amount of power generation, the power generation apparatus outputs an acknowledging signal to each of at least one electric product which outputs the first power request signal among the plurality of electric products.

In one embodiment of the invention, the power supply system further includes a power supply apparatus for outputting at least one of power supplied from the power generation apparatus and power supplied from a power supply source other than the power generation apparatus. The power generation apparatus determines whether or not the amount of power generation matches the target amount of power generation which is determined in accordance with the second power request signal. When the amount of power generation is determined to match the target amount of power generation, the power generation apparatus outputs a matching signal to the power control apparatus. The power control apparatus determines whether or not an amount of power requested by a current second power request signal is increased as compared with an amount of power requested by a previous second power request signal. When it is determined that the amount of power requested by the current second power request signal is increased as compared with the amount of power requested by the previous second power request signal, the power control apparatus controls the power supply apparatus to compensate for an insufficiency in the power supplied from the power generation apparatus with power supplied from the power supply source, during a period from when the current second power request signal is output to the power generation apparatus until when the matching signal is received from the power generation apparatus.

In one embodiment of the invention, the power control apparatus controls the power supply apparatus to compensate for the insufficiency in the power supplied from the power generation apparatus with power supplied from the power supply source only when the increase of the amount of power requested by the current second power request signal over the amount of power requested by the previous second power request signal is equal to or more than a prescribed value.

In one embodiment of the invention, the power supply source supplies commercial power.

In one embodiment of the invention, the power supply source is a storage cell.

In one embodiment of the invention, the plurality of electric products are connected to the power control apparatus via a wired system or a wireless system.

In one embodiment of the invention, the first power request signal is a state signal indicating a state of the electric product; and the power control apparatus obtains an amount of power required by the electric product in the state which is indicated by the state signal, and generates the second power request signal based on the amount of power required by the electric product.

According to another aspect of the invention, a computer system includes a server computer and a terminal. The server computer includes a storage section for storing a correspondence table indicating a relationship between a state of an electric product and power consumption of the electric product in the state. The correspondence table is downloaded from the server computer through a network in accordance with a request from the terminal.

In one embodiment of the invention, the terminal is connected to a power supply system. The power supply system includes a plurality of electric products, a power generation apparatus capable of varying an amount of power generation, and a power control apparatus for controlling power supply from the power generation apparatus to the plurality of electric products. The downloaded correspondence table is stored in the power control apparatus.

According to still another aspect of the invention, a method for selling an electric product includes the step of selling an electric product with a URL address for obtaining a correspondence table regarding the electric product, the correspondence table indicating a relationship between a state of the electric product and power consumption of the electric product in the state.

Thus, the invention described herein makes possible the advantages of providing a power generation system for stably supplying power while achieving energy savings.

These and other advantages of the current invention will become apparent to those skilled in the art upon reading and understanding the following detailed description with reference to the accompanying figures.

BRIEF DESCRIPTION OF THE DRAWINGS

FIG. 12A shows an example of a correspondence table 510 on a TV having a BS recording function;

FIG. 12B shows an example of a correspondence table 520 on a washing machine;

FIG. 13A shows an example of a home page of a "web site for electric products usable for the power supply system";

FIG. 13B shows an example of a "search for a correspondence table" web page; and FIG. 13C shows an example of a "confirm the correspondence table" web page.

DESCRIPTION OF THE EMBODIMENTS

Hereinafter, the current invention will be described by way of illustrative examples with reference to the accompanying drawings.

Example 1

Figure 1:
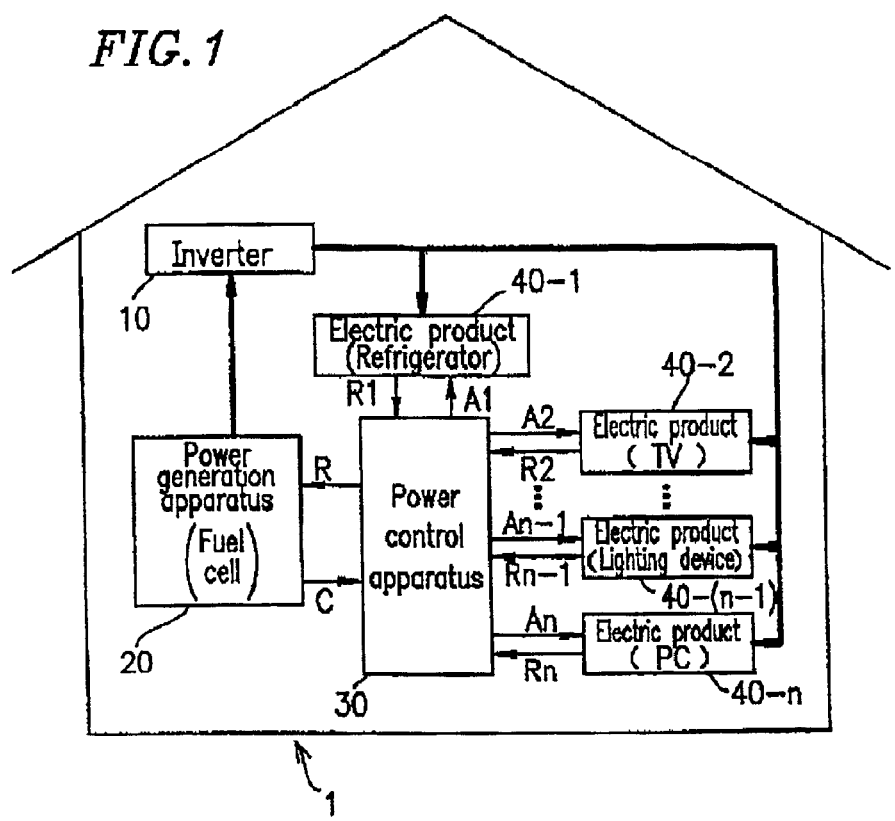
FIG. 1 is a view illustrating a structure of a power supply system 1 in a first example according to the current invention.

FIG. 1 shows a structure of a power supply system 1 in a first example according to the current invention. The power supply system 1 is an example of an independent type power supply system of generating all the power necessary in a house without being supplied with power from any other power supply source.

The power supply system 1 includes a plurality of electric products 40-1 through 40-n, a power generation apparatus 20 capable of varying an amount of power generation, and a power control apparatus 30 for controlling power supply from the power generation apparatus 20.

In the following description, the power generation apparatus 20 is assumed to be a fuel cell (for example, PEFC or polymer electrolyte fuel cell). The fuel cell is supplied with hydrogen produced from fuel gas such as municipal gas by a fuel quality improving apparatus (not shown). The reason why the power generation apparatus 20 is assumed to be a fuel cell is that a fuel cell is most practical as a power generation apparatus capable of varying an amount of power generation in today's state of the art. Any type of power generation apparatus capable of varying an amount of power generation can be used as the power generation apparatus 20.

Each of the plurality of electric products 40-1 through 40-n can be any product such as, for example, a refrigerator, a television (TV), a lighting device, a personal computer (PC), a microwave oven, an audio player, a DVD player, a telephone, or a fax. In the following description, it is assumed that the electric product 40-1 is a refrigerator, the electric product 40-2 is a TV, the electric product 40-(n-1) is a lighting device, and the electric product 40-n is a personal computer, as shown in FIG. 1.

The plurality of electric products 40-1 through 40-n are each connected to the power control apparatus 30 via a dedicated line. However, the connection between the plurality of electric products 40-1 through 40-n and the power control apparatus 30 is not limited to this. For example, the plurality of electric products 40-1 through 40-n can be connected to the power control apparatus 30 via a wireless or wired system. As a wireless system, for example, Blue Tooth or a communication line for cellular phones or PHS is usable. As a wired system, for example, a telephone line such as ISDN or a local area network (LAN) such as HAVI or Econet is usable.

The power generated by the fuel cell 20 is supplied to the plurality of electric products 40-1 through 40-n via an inverter 10. The inverter 10 converts DC power into AC power. It is assumed that the plurality of electric products 40-1 through 40-n are continuously supplied with a minimum required amount Rm of power for communication between the plurality of electric products 40-1 through 40-n and the power control apparatus 30. Herein, the "minimum required amount Rm of power for communication between the plurality of electric products 40-1 through 40-n and the power control apparatus 30" includes the power required to transfer data between the plurality of electric products 40-1 through 40-n and the power control apparatus 30 and the power consumed by the plurality of electric products 40-1 through 40-n while they are at wait.

The electric product 40-i is structured to output a power request signal Ri (first power request signal) for requesting a desired amount of power to the power control apparatus 30. Here, i=1, ..., n.

For example, it is assumed that when a power switch of the electric product 40-1 (refrigerator) is switched from off to on, an amount of power which is necessary for the electric product 40-1 to perform a rated operation is p1 (W). In this case, when the power switch of the electric product 40-1 is switched from off to on, the electric product 40-1, in response to the switching, outputs a power request signal R1 for requesting the amount p1 of power which is necessary to perform the rated operation.

The power control apparatus 30 receives a plurality of power request signals Ri from the respective plurality of electric products 40-1 through 40-n. The power control apparatus 30 generates a power request signal R (second power request signal) for requesting an amount of power which is determined in accordance with a total amount of power requested by the plurality of power request signals Ri, and outputs the power request signal R to the fuel cell 20.

The fuel cell 20 increases or decreases the amount of power generation so as to be matched with a target amount of power generation which is determined in accordance with the power request signal R.

In the power supply system 1 described above, a power request signal R based on a total of the power request signals Ri from the electric products 40-1 is output to the fuel cell 20, and the amount of power generated by the fuel cell 20 is controlled by the power request signal R. Thus, the fuel cell 20 can be controlled to generate a "necessary amount" of power "when necessary" in response to a request from the electric products. As a result, the amount of power generation by the fuel cell 20 is not necessarily increased, which achieves energy savings.

Figure 2:
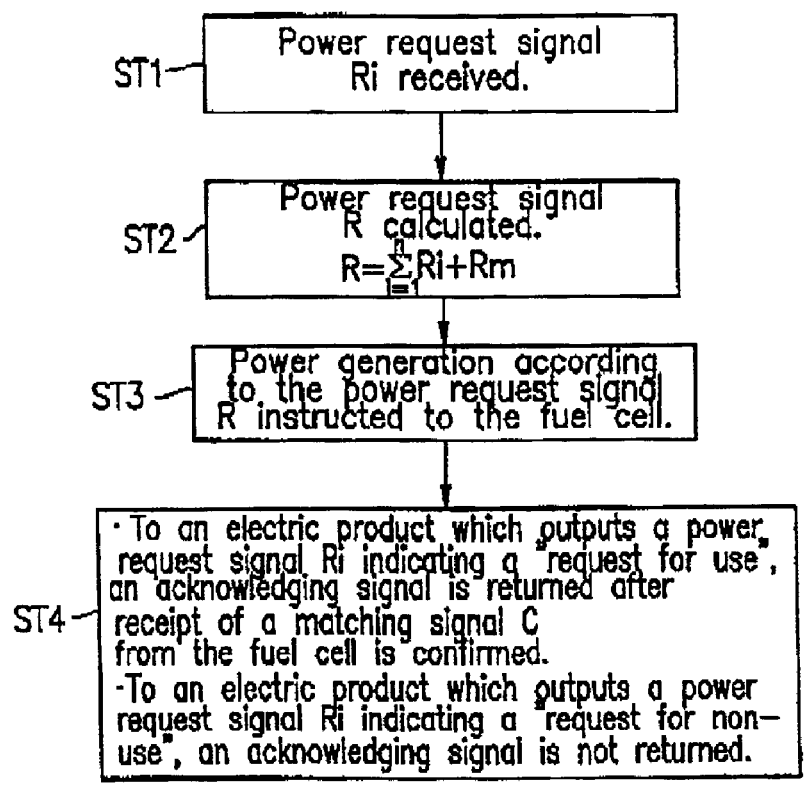
FIG. 2 is a flowchart illustrating a procedure of processing executed by a power control apparatus 30 in the power supply system 1 shown in FIG. 1.

FIG. 2 shows a procedure of processing executed by the power control apparatus 30. In the example shown in FIG. 2, it is assumed that a power request signal Ri output from the electric product 40-i indicates a "request for use" or a "request for non-use". When a user demands to use the electric product 40-i (for example, when the user switches the power switch of the electric product 40-i from off to on), the electric product 40-i outputs a power request signal Ri indicating a "request for use" to the power control apparatus 30. When the user demands to put the electric product 40-i into a non-use state (for example, when the user switches the power switch of the electric product 40-i from on to off), the electric product 40-i outputs a power request signal Ri indicating a "request for non-use" to the power control apparatus 30.

In step ST1, the power control apparatus 30 receives power request signal Ri from the electric product 40-i which outputs the power request signal Ri among the plurality of electric products 40-1 through 40-n. The power request signal Ri is sent to the power control apparatus 30 from the electric product 40-i. The power request signal Ri indicates the number of watts (pi) of power necessary to put the electric product 40-i into a usable state. Here, in a power request signal Ri indicating a "request for use", pi>0. In a power request signal Ri indicating a "request for non-use", pi=0. A power request signal Ri is represented by, for example, 8-bit digital data.

The power request signal Ri is held in the power control apparatus 30 until the next power request signal Ri is received by the power control apparatus 30.

In step ST2, the power control apparatus 30 generates a power request signal R so as to fulfill expression (1). The power request signal R indicates the number of watts (p) of power to be supplied by the fuel cell 20. The power request signal R is represented by, for example, digital data having a prescribed number of bits.

$$R = \sum_{i=1}^{n} Ri + Rm \qquad \text{expression (1)}$$

Here, Ri (i=1, ..., n) indicates the amount of power requested by the power request signal Ri. Rm indicates the minimum necessary amount of power for communication between the plurality of electric products 40-1 through 40-n and the power control apparatus 30.

In step ST3, the power control apparatus 30 outputs the power request signal R to the fuel cell 20, thereby instructing the fuel cell 20 to perform power generation in accordance with the power request signal R.

The fuel cell 20 receives the power request signal R from the power control apparatus 30 and controls the amount of power generation so as to match the amount of power generation with a target amount of power generation which is determined in accordance with the power request signal R. The target amount of power generation of the fuel cell 20 can be set to be matched to the amount of power requested by the power request signal R or can be set to be matched to a sum of the amount of power requested by the power request signal R and a margin m in consideration of the margin m. The amount of power generation of the fuel cell 20 is increased or decreased by, for example, increasing or decreasing the supply amount of fuel gas such as natural gas or LP gas. Alternatively, when the fuel quality improving apparatus is not necessary, hydrogen can directly be supplied to the fuel cell 20.

The fuel cell 20 determines whether or not the amount of power generation matches the target amount of power generation which is determined in accordance with the power request signal R. When the amount of power generation is determined to have matched, the fuel cell 20 outputs a matching signal C to the power control apparatus 30.

In step ST4, the power control apparatus 30 confirms whether or not the matching signal C is received from the fuel cell 20.

To the electric product 40-i which has output a power request signal Ri indicating a "request for use", the power control apparatus 30 returns an acknowledging signal after confirming that the matching signal C is received from the fuel cell 20. The acknowledging signal is sent from the power control apparatus 30 to the electric product 40-i which outputs the power request signal Ri indicating a "request for use" in order to inform the electric product 40-i that "the amount of power generation of the fuel cell 20 has reached the target amount of power generation. The electric product 40-i which outputs the power request signal Ri indicating a "request for use" waits until receiving the acknowledging signal from the power control apparatus 30, and starts an operation corresponding to the "request for use" after receiving the acknowledging signal.

To the electric product 40-i which has output a power request signal Ri indicating a "request for non-use", the power control apparatus 30 does not return an acknowledging signal. The "request for non-use" is a request for reducing the amount of power requested. Accordingly, it is not necessary to inform the electric product 40-i which outputs a power request signal Ri indicating a "request for non-use" that "the amount of power generation of the fuel cell 20 has reached the target amount of power generation. The electric product 40-i which outputs a power request signal Ri indicating a "request for non-use" starts an operation corresponding to the "request for non-use" immediately after outputting such a power request signal Ri to the power control apparatus 30 without waiting for receipt of the acknowledging signal from the power control apparatus 30. Here, an operation corresponding to the "request for non-use" encompasses "no operation".

When the electric product 40-i is connected to the power control apparatus 30 via a dedicated line, the acknowledging signal is sent by, for example, changing the level of a power permission signal Ai (which is continuously output from the power control apparatus 30 to the electric product 40-i) from a low level (0) to a high level (1). Here, the high level (1) of the power permission signal Ai means that a power supply to the electric product 40-i is permitted, and the low level (0) of the power permission signal Ai means that a power supply to the electric product 40-i is not permitted (i.e., the power supply is prohibited).

When the electric product 40-i is connected to the power control apparatus 30 through a local area network (LAN), the power permission signal Ai does not need to be continuously output to the electric product 40-i. In this case, the power control apparatus 30 can be structured to send the power permission signal Ai to the electric product 40-i in response to an occurrence of an event (for example, the user's operation of the power switch from off to on).

At the time when the electric product 40-i outputs a power request signal Ri indicating a "request for use" to the power control apparatus 30, the level of the power permission signal Ai supplied to the electric product 40-i is set to be a low level (0). The power control apparatus 30 changes the level of the power permission signal Ai from a low level (0) to a high level (1) after confirming that the matching signal C is received from the fuel cell 20. This means that at the time when the amount of power generation of the fuel cell 20 reaches the target amount of power generation, the level of the power permission signal Ai supplied to the electric product 40-i is set to be a high level (1). After the level of the power permission signal Ai is set to be a high level (1), the electric product 40-i starts an operation corresponding to a "request for use".

At the time when the electric product 40-i outputs a power request signal Ri indicating a "request for non-use" to the power control apparatus 30, the level of the power permission signal Ai supplied to the electric product 40-i is set to be a high level (1). The power control apparatus 30 changes the level of the power permission signal Ai from a high level (1) to a low level (0) immediately after receiving a power request signal Ri indicating a "request for non-use" from the electric product 40-i without waiting for the receipt of the matching signal C from the fuel cell 20. This means that the level of the power permission signal Ai supplied to the electric product 40-i is set to be a low level (0), regardless of whether or not the amount of power generation of the fuel cell 20 has reached the target amount of power generation. After the level of the power permission signal Ai is set to be a low level (0) the electric product 40-i starts an operation corresponding to a "request for non-use".

According to the above-described power supply system 1, in response to the matching signal C, an acknowledging signal is sent to the electric product 40-i which outputs the power request signal Ri indicating a "request for use". The electric product 40-i which outputs such a power request signal Ri waits until receiving the acknowledging signal indicating that "the amount of power generation of the fuel cell 20 has reached the target amount of power generation" from the power control apparatus 30, and then starts an operation corresponding to the "request for use". This guarantees that electric product 40-i operates under conditions which are necessary for the electric product 40-i to realize a prescribed function without fail (rated conditions); namely, this guarantees that the electric product 40-i performs a rated operation. As a result, the frequency of the electric product 40-i malfunctioning is significantly reduced.

Also according to the above-described power supply system 1, the electric product 40-i which outputs a power request signal Ri indicating a "request for non-use" immediately starts an operation corresponding to the "request for non-use" without confirming that "the amount of power generation of the fuel cell 20 has reached the target amount of power generation". This allows the electric product 40-i to be put into a non-use state rapidly when the user demands to put the electric product 40-i into a non-use state (for example, when the user demands to stop the operation of the electric product 40-i).

In the first example, the fuel cell 20 determines whether or not the amount of power generation has reached the target amount of power generation which is determined in accordance with a power request signal R. Then, the fuel cell 20 outputs a matching signal C indicating the result of the determination to the power control apparatus 30. In response to the matching signal C, the power control apparatus 30 outputs an acknowledging signal to each of at least one electric product 40-i which outputs a power request signal Ri indicating a "request for use". Alternatively, the fuel cell 20 can directly return the acknowledging signal to each of at least one electric product 40-i which outputs a power request signal Ri indicating a "request for use". In order to realize this, however, the power control apparatus 30 needs to be structured to output a power request signal Ri to the fuel cell 20 as well as a power request signal R.

Example 2

Figure 3:
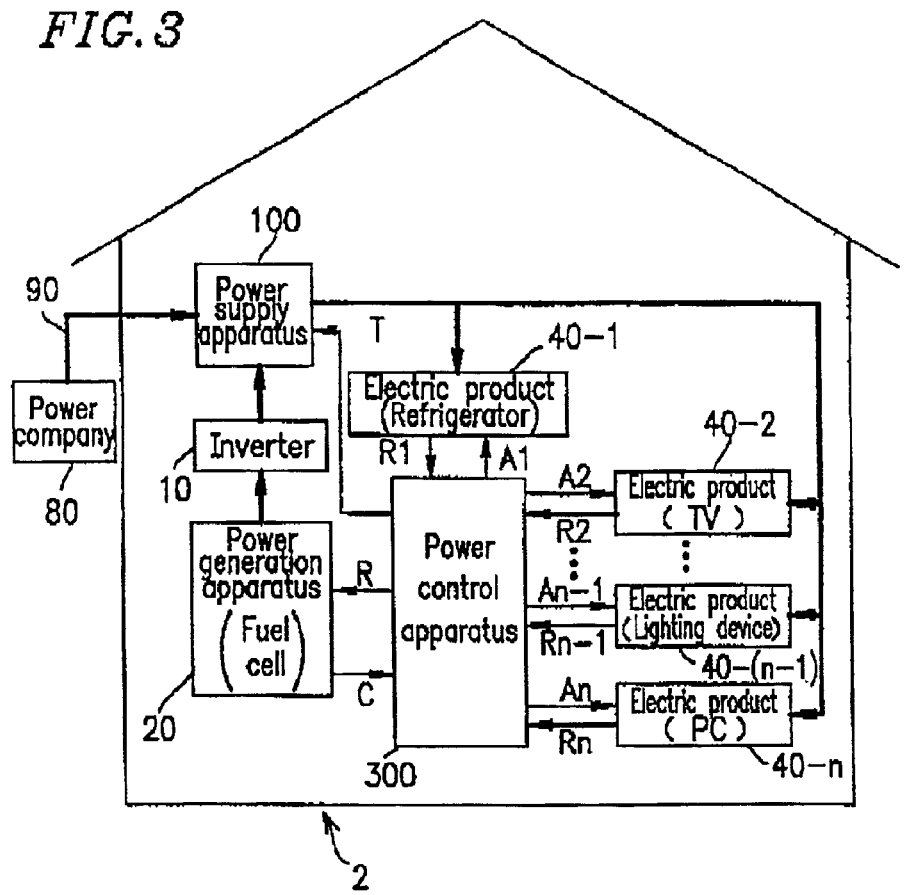
FIG. 3 is a view illustrating a structure of a power supply system 2 in a second example according to the current invention.

FIG. 3 shows a structure of a power supply system 2 in a second example according to the current invention. The power supply system 2 is an example of a type of power supply system which, in principle, generates all the power necessary in a house using a fuel cell, but when the amount of power generation is insufficient, receives power (for example, commercial power) from a power supply source other than the fuel cell until the amount of power generation is confirmed to reach the target amount of power generation.

In FIG. 3, identical elements previously discussed with respect to FIG. 1 bear identical reference numerals and the detailed descriptions thereof will be omitted.

The power supply system 2 includes a power supply apparatus 100 in addition to the elements in the power supply system 1 (FIG. 1).

The power supply apparatus 100 outputs at least one of power supplied from the fuel cell 20 and power supplied from a power company 80 via a power line 90 to each of the plurality of electric products 40-1 through 40-n.

A power control apparatus 300 includes a buffer (not shown) for storing a power request signal R which was output immediately previously (hereinafter, referred to as the "previous power request signal R"). The power control apparatus 300 determined whether or not an amount of power generation requested by a power request signal R, which is calculated by expression (1) and is to be output to the fuel cell 20, is increased as compared with the amount of power generation requested by the "previous power request signal R". (Hereinafter, the power request signal R which is calculated by expression (1) and is to be output to the fuel cell 20 will be referred to as the "current power request signal R"). When it is determined that the amount of power generation requested by the "current power request signal R" is increased as compared with the amount of power generation requested by the "previous power request signal R", the power control apparatus 300 outputs a power purchase signal T (for example, a high level signal) to the power supply apparatus 100. Due to the power purchase signal T, an amount of power corresponding to the insufficiency in the power generated by the fuel cell 20 is supplied to the plurality of electric products 40-1 through 40-n from the power company 80 via the power supply apparatus 100. Upon confirming receipt of a matching signal C from the fuel cell 20, the power control apparatus 300 outputs a power purchase signal T (for example, a low level signal) to the power supply apparatus 100. Due to the power purchase signal T, the power supply from the power company 80 is stopped.

As described above, the power control apparatus 300 controls the power supply apparatus 100 to compensate for the insufficiency in the amount of power supplied from the fuel cell 20 with the power supplied from the power company 80 via the power line 90 until the amount of power generation of the fuel cell 20 is confirmed to reach the target amount of power generation (i.e., the period from the output of the current power request signal R to the fuel cell 20 until the receipt of the matching signal C from the fuel cell 20). Thus, the power control apparatus 300 can return an acknowledging signal at real time to the electric product 40-i which outputs a power request signal Ri indicating a "request for use" without waiting until the amount of power generation of the fuel cell 20 reaches the target amount of power generation. As a result, the user is prevented from experiencing the discomfort of delayed start of the operation of the electric product 40-i.

The power control apparatus 300 can alternatively be structured to determine whether or not the increase of the amount of power generation requested by the current power request signal R over the amount of power generation requested by the previous power request signal R is equal to or more than a prescribed value. In this case, the power control apparatus 300 can be structured to control the power supply apparatus 100, only when the excess is determined to be equal to or more than the prescribed value, to compensate for the insufficiency in the power supplied by the fuel cell 20 with the power supplied via the power line 90 until the amount of power generation of the fuel cell 20 is confirmed to reach the target amount of power generation.

The power supply source other than the fuel cell 20 which is connected to the power supply apparatus 100 can be any type of power supply source. The power supply source can be, for example, a commercial power supply source or a storage cell.

Figure 4:
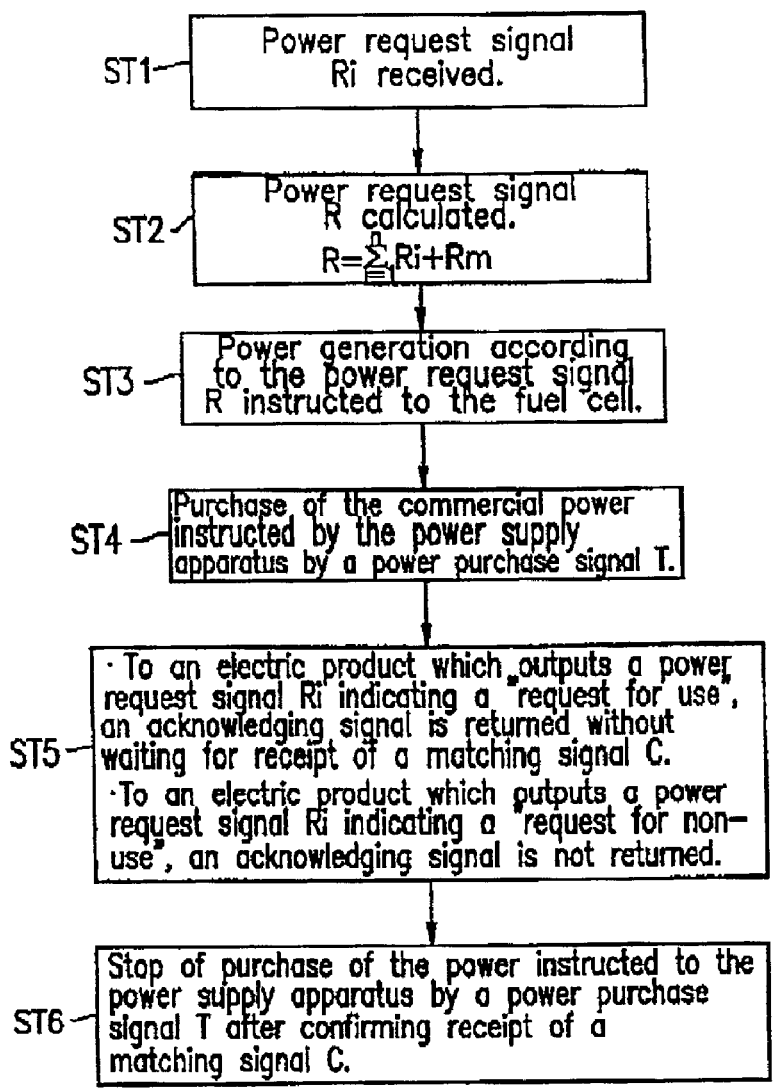
FIG. 4 is a flowchart illustrating a procedure of processing executed by a power control apparatus 300 in the power supply system 2 shown in FIG. 3.

FIG. 4 shows a procedure of processing executed by the power control apparatus 300. In the example shown in FIG. 4. It is assumed that a power request signal Ri output from the electric product 40-i indicates a "request for use" or a "request for non-use".

In step ST1, the power control apparatus 300 receives a power request signal Ri from the electric product 40-i which outputs the power request signal Ri among the plurality of electric products 40-1 through 40-n. The processing in step ST1 is the same as that shown in FIG. 2.

In step ST2, the power control apparatus 300 generates a power request signal R so as to fulfill expression (1). The processing in step ST2 is the same as that shown in FIG. 2.

In step ST3, the power control apparatus 300 outputs the power request signal R to the fuel cell 20, thereby instructing the fuel cell 20 to perform power generation in accordance with the power request signal R. The processing in step ST3 is the same as that shown in FIG. 2.

In step ST4, the power control apparatus 300 determines whether or not the amount of power generation requested by the "current power request signal R" is increased as compared with the amount of power generation requested by the "previous power request signal R". When it is determined that the amount of power generation requested by the "current power request signal R" is increased as compared with the amount of power generation requested by the "previous power request signal R", the power control apparatus 300 outputs a power purchase signal T to the power supply apparatus 100, thereby instructing the power supply apparatus 100 to purchase an amount of power corresponding to the insufficiency in the power generated by the fuel cell 20 from the power company 80.

In step ST5, to the electric product 40-i which has output a power request signal Ri indicating a "request for use", the power control apparatus 300 returns an acknowledging signal without confirming receipt of a matching signal C from the fuel cell 20. The power control apparatus 300 can send the acknowledging signal in this manner by immediately changing the level of the power permission signal Ai from a low level (0) to a high level (1) when the power request signal Ri indicating a "request for use" is received from the electric product 40-i without waiting for the receipt of the matching signal C from the fuel cell 20.

To the electric product 40-i which has output a power request signal Ri indicating a "request for non-use", the power control apparatus 300 does not return an acknowledging signal. The processing in this case is the same as that in step ST4 in FIG. 2.

In step ST6, the power control apparatus 300 confirms whether or not a matching signal C is received from the fuel cell 20. Upon confirming receipt of the matching signal C is received from the fuel cell 20, the power control apparatus 300 outputs a power purchase signal T to the power supply apparatus 100, thereby instructing the power supply apparatus 100 to stop the purchase of the power supplied from the power company 80.

Figure 5:
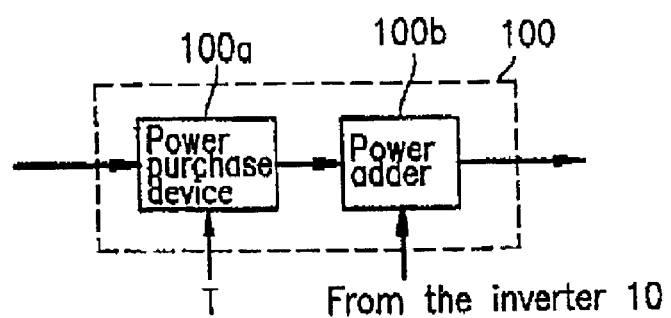
FIG. 5 is a diagram illustrating an internal structure of a power supply apparatus 100 in the power supply system 2 shown in FIG. 3.

FIG. 5 shows an internal structure of the power supply apparatus 100. The power supply apparatus 100 includes a power purchase device 100a and a power adder 100b.

The power purchase device 100a is connected to the power company 80 (FIG. 3) via the power line 90. In accordance with the value of the power purchase signal T, the power purchase device 100a switches the power from the power company 80 to be permitted to be supplied to the power adder 100b or prohibited from being supplied to the power adder 100b. The power purchase device 100a includes, for example, a switch (not shown) for determining whether the power adder 100b should be electrically connected to the power company 80 or not. The switch is opened or closed in accordance with the value of the power purchase signal T.

The power adder 100b is connected between an output of the power purchase device 100a and an output of the inverter 10. The power adder 100b adds an output from the power purchase device 100a and an output from the inverter 10 and outputs the sum result to the plurality of electric products 40-1 through 40-n.

According to the power supply apparatus 100 having a structure shown in FIG. 5, when the power purchase signal T permits the power from the power company 80 to be supplied to the power adder 100b, an amount of power corresponding to the insufficiency in the power generated by the fuel cell 20 is pulled into the power adder 100b from the power company 80 via the power purchase device 100a. As a result, even until the amount of power generation of the fuel cell 20 reaches the target amount of power generation, an appropriate amount of power is output from the power adder 100b.

According to the power supply system 2, as described above, the power control apparatus 300 immediately returns an acknowledging signal to the electric product 40-i which outputs a power request signal Ri indicating a "request for use" upon receiving such a power request signal. This is permitted since even until the amount of power generation of the fuel cell 20 reaches the target amount of power generation, stable supply of power to the electric product 40-i is guaranteed. Therefore, it is not necessary for the electric product 40-i which outputs the above-mentioned power request signal Ri to wait to start an operation corresponding to the "request for use" until the amount of power generation of the fuel cell 20 reaches the target amount of power generation. As a result, the electric product 40-i can immediately start an operation corresponding to the "request for use" after outputting the above-mentioned power request signal Ri to the power control apparatus 300. This guarantees that the electric product 40-i operates under rated conditions immediately after the electric product 40-i outputs the power request signal Ri indicating a "request for use" to the power control apparatus 300. As a result, the frequency of the electric product 40-i malfunctioning is significantly reduced.

Alternatively, the power control apparatus 300 can be structured not to return an acknowledging signal to the electric product 40-i which outputs a power request signal Ri regardless of the type of the power request signal Ri received from the electric product 40-i (for example, regardless of whether the power request signal Ri indicates a "request for use" or a "request for non-use"). This is permitted since stable supply of power to the electric product 40-i is guaranteed even until the amount of power generation of the fuel cell 20 reaches the target amount of power generation. Therefore, the electric product 40-i can immediately start a desired operation after outputting a power request signal Ri to the power control apparatus 300 regardless of the type of the power request signal Ri output to the power control apparatus 300 (for example, regardless of whether the power request signal Ri indicates a "request for use" or a "request for non-use").

Example 3

Figure 6:
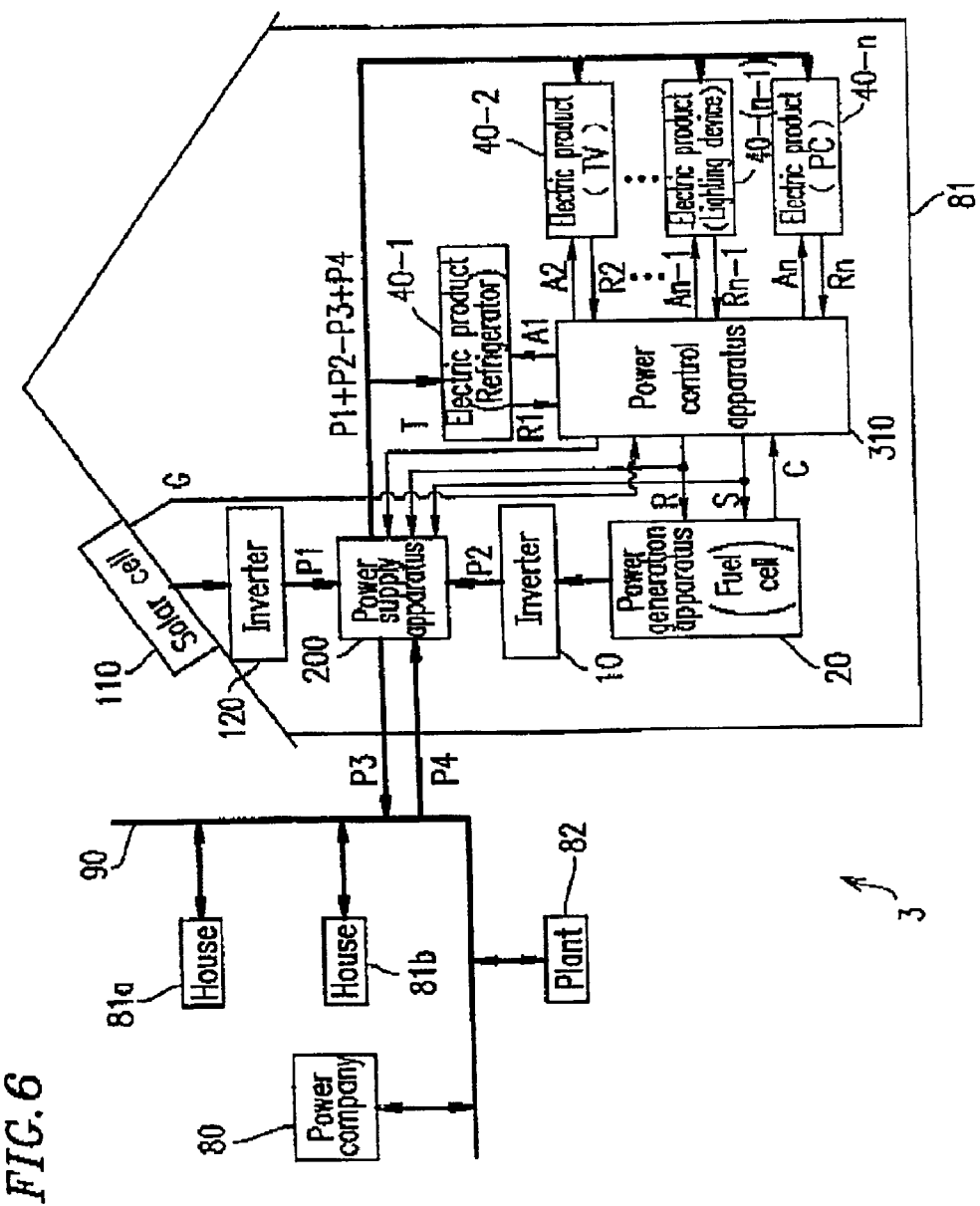
FIG. 6 is a view illustrating a structure of a power supply system 3 in a third example according to the current invention.

FIG. 6 shows a structure of a power supply system 3 in a third example according to the current invention. The power supply system 3 is an example of an integrated type power supply system which uses both a solar cell and a fuel cell. The power supply systems described in the first and second examples do not use a solar cell, but can use a solar cell together with a fuel cell.

The power supply system 3 generates all the power necessary in a house using a solar cell and a fuel cell in principle. However, the power supply system 3 is structured as follows: when the total amount of power generated by the solar cell and the fuel cell is insufficient, the power supply system 3 can purchase power (for example, commercial power) from a power supply source other than the solar cell or the fuel cell until the amount of power generation of the fuel cell is confirmed to reach a target amount of power generation; and when the total amount of power generated by the solar cell and the fuel cell is excessive, the power supply system 3 can sell the excess amount of the power to a power company.

In FIG. 6, the identical elements previously discussed with respect to FIG. 1 bear identical reference numerals and the detailed descriptions thereof will be omitted.

The power supply system 3 includes a solar cell 110, an inverter 120 and a power supply apparatus 200 in addition to the elements in the power supply system 1 (FIG. 1).

The solar cell 110 supplies power generated by solar energy to the power supply apparatus 200 through the inverter 120. The inverter 120 converts DC power to AC power.

The solar cell 110 outputs a power generation signal G, which indicates an amount of power generation of the solar cell 110, to a power control apparatus 310.

The power supply apparatus 200 is connected to a power company 80, homes 81a, 81b and a factory 82 via a power line 90. The power supply system 3 is located within a home 81.

The power supply apparatus 200 outputs a portion P3 of power P1 supplied from the solar cell 110 to a power company 80 via a power line 90. The power supply apparatus 200 also outputs an amount of power which is equal to a sum of (i) a remaining portion (P1–P3) of the power P1 supplied from the power company 80, (ii) power P2 supplied from the fuel cell 20, and (iii) power P4 supplied from the power company 80 via the power line 90 (namely, P1+P2−P3+P4) to the plurality of electric products 40-1 through 40-n.

The plurality of electric products 40-1 through 40-n and the solar cell 110 are each connected to the power control apparatus 310 via a dedicated line. However, the connection between the plurality of electric products 40-1 through 40-n and the solar cell 110 with the power control apparatus 310 is not limited to this. For example, the plurality of electric products 40-1 through 40-n and the solar cell 110 can each be connected to the power control apparatus 310 via a wireless or wired system. As a wireless system, for example, Blue Tooth or a communication line for cellular phones or PHS is usable. As a wired system, for example, a telephone line such as ISDN or a local area network such as HAVI or Econet is usable.

Figure 7:
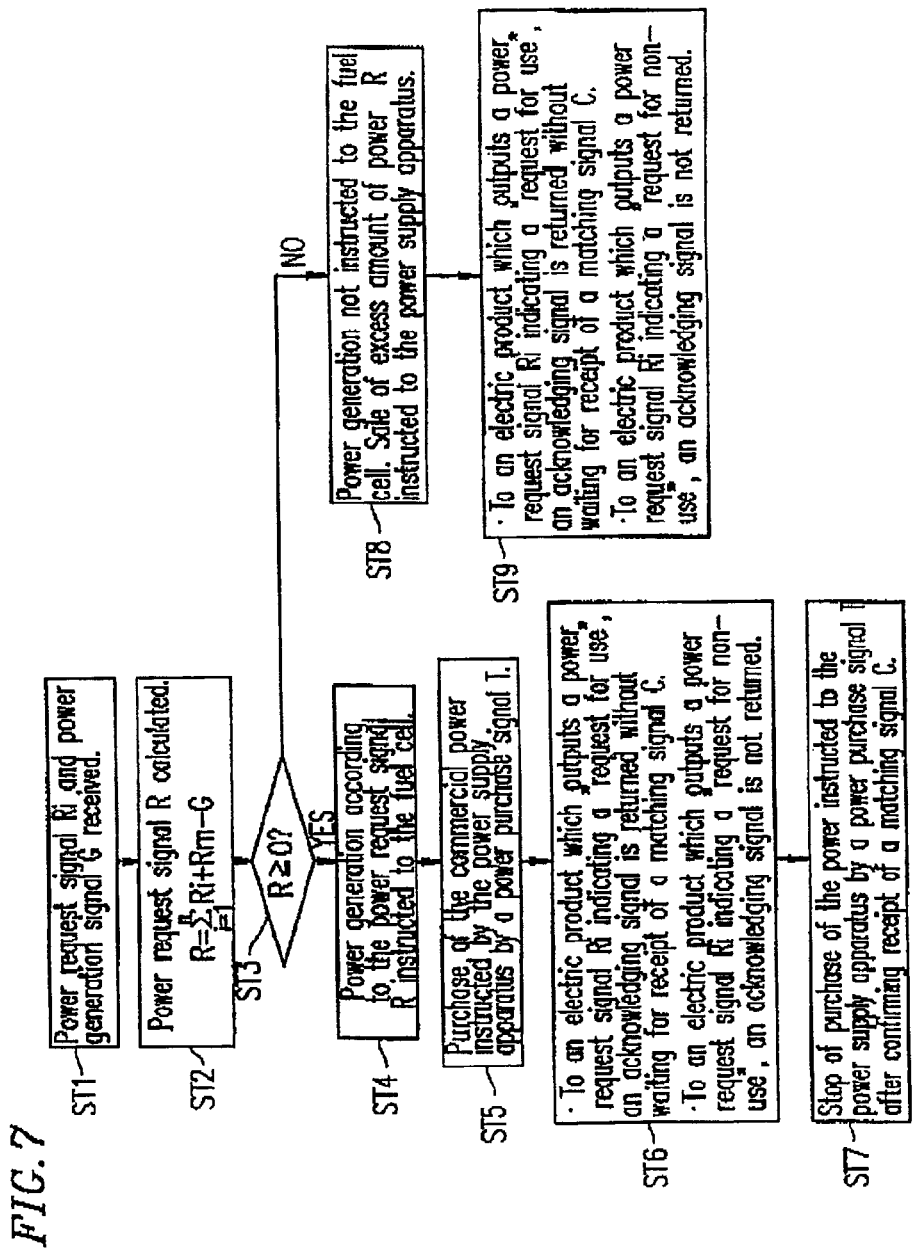
FIG. 7 is a flowchart illustrating a procedure of processing executed by a power control apparatus 310 in the power supply system 3 shown in FIG. 6.

FIG. 7 shows a procedure of processing executed by the power control apparatus 310. In the example shown in FIG. 7, it is assumed that a power request signal Ri output from the electric product 40-i indicates a "request for use" or a "request for non-use".

In step ST1, the power control apparatus 310 receives a power request signal Ri from the electric product 40-i which outputs the power request signal Ri among the plurality of electric products 40-1 through 40-n. The power control apparatus 310 also receives a power generation signal G from the solar cell 110. The power generation signal C is represented by, for example, 8-bit digital data.

In step ST2, the power control apparatus 310 generates a power request signal R so as to fulfill expression (2). The power request signal R indicates the number of watts (p) of the power to be supplied by the fuel cell 20. The power request signal R is represented by, for example, digital data having a prescribed number of bits.

$$R = \sum_{i=1}^{n} Ri + Rm - G \qquad \text{expression (2)}$$

Here, Ri (i=1, . . . , n) indicates the amount of power requested by the power request signal Ri. Rm indicates the minimum necessary amount of power for communication between the plurality of electric products 40-1 through 40-n and the power control apparatus 310. G indicates an amount of power generated by the solar cell 110.

In step ST3, the power control apparatus 310 determines whether the value of the power request signal R is positive or negative, and outputs a sign signal S indicating the determination result to the fuel cell 20 and the power supply apparatus 200. For example, the value of "1" of the sign signal S means that the value of the power request signal R is negative, and the value of "0" of the sign signal S means that the value of the power request signal R is 0 or positive.

When R≧0 in step ST3, the processing goes to step ST4. When R<0 in step ST3, the processing goes to step ST8.

The processing in steps ST4 through ST7 (processing performed when the amount of power generation of the fuel cell 20 is insufficient) is the same as the processing in steps ST3 through ST6 shown in FIG. 4.

In step ST8, the power control apparatus 310 instructs the power supply apparatus 200 to sell an excess amount of power |R|(=P3) out of the power P1 supplied from the solar cell 110. In this case, the fuel cell 20 does not need to generate power. Therefore, the power control apparatus 310 does not instruct the fuel cell 20 to generate power. The remaining portion of the power P1 supplied from the solar cell 110 (power other than |R|, i.e., P1−P3) is output to the electric products 40-i through 40-n through the power supply apparatus 200.

The processing in step ST9 is the same as that of step ST5 shown in FIG. 4.

Figure 8:
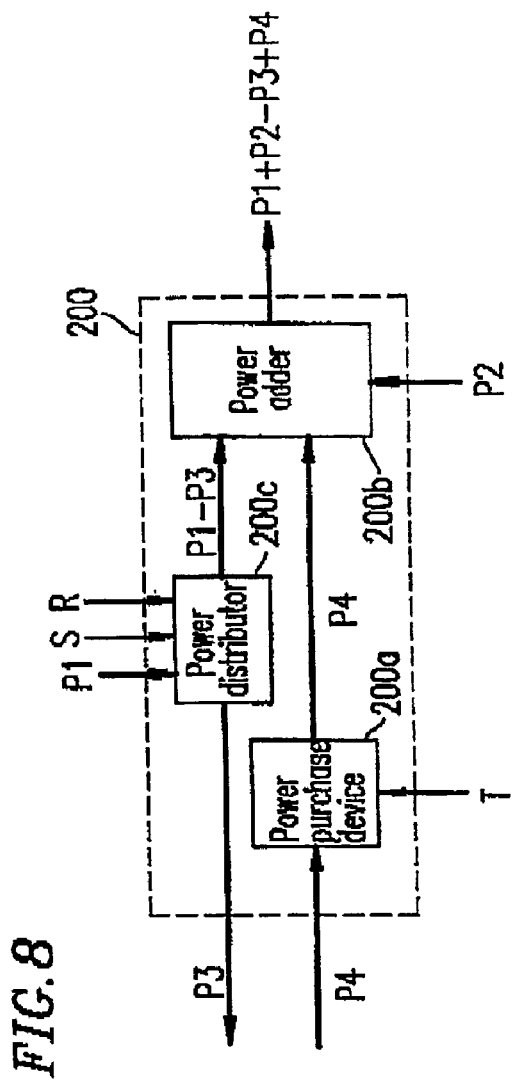
FIG. 8 is a diagram illustrating an internal structure of a power supply apparatus 200 in the power supply system 3 shown in FIG. 3.

FIG. 8 shows an internal structure of the power supply apparatus 200. The power supply apparatus 200 includes a power purchase device 200a, a power adder 200b, and a power distributor 200c.

The power purchase device 200a is connected to houses 81a and 81b (FIG. 6), the power company 80, and a plant 82 via the power line 90. The power purchase device 200a is provided with a power purchase signal T. In accordance with the value of the power purchase signal T, the power purchase device 200a switches the power P4 from the power company 80 to be permitted to be supplied to the power adder 200b or prohibited from being supplied to the power adder 200b. The power purchase device 200a includes, for example, a switch (not shown) for determining whether or not the power adder 200b should be electrically connected to the power company 80. The switch is opened or closed in accordance with the value of the power purchase signal T.

The power distributor 200c is provided with a power request signal R and a sign signal S which indicates whether the value of the power request signal R is positive or negative.

When the sign signal S is determined to be 0 (i.e., the power request signal R is 0 or positive), the power distributor 200c outputs all the power P1 supplied from the solar cell 110 to the power adder 200b (i.e., P3=0).

When the sign signal S is determined to be 1 (i.e., the power request signal R is negative), the power distributor 200c outputs an excess amount of power |R|(=P3) out of the power P1 supplied from the solar cell 110 to the power company 80 via the power line 90, and outputs the remaining power (P1−P3) to the power adder 200b.

The power adder 200b is connected to an output of the power purchase device 200a, to an output of the inverter 10, and to an output of the power distributor 200c. The power adder 200b adds an output P4 from the power purchase device 200a, an output P2 from the inverter 10, and an output (P1−P3) from the power distributor 200c, and outputs the sum result (P1+P2−P3+P4) to the plurality of electric products 40-1 through 40-n. Here, when R≧0, P3=0, and when R<0, P3=|R|.

Figure 9:
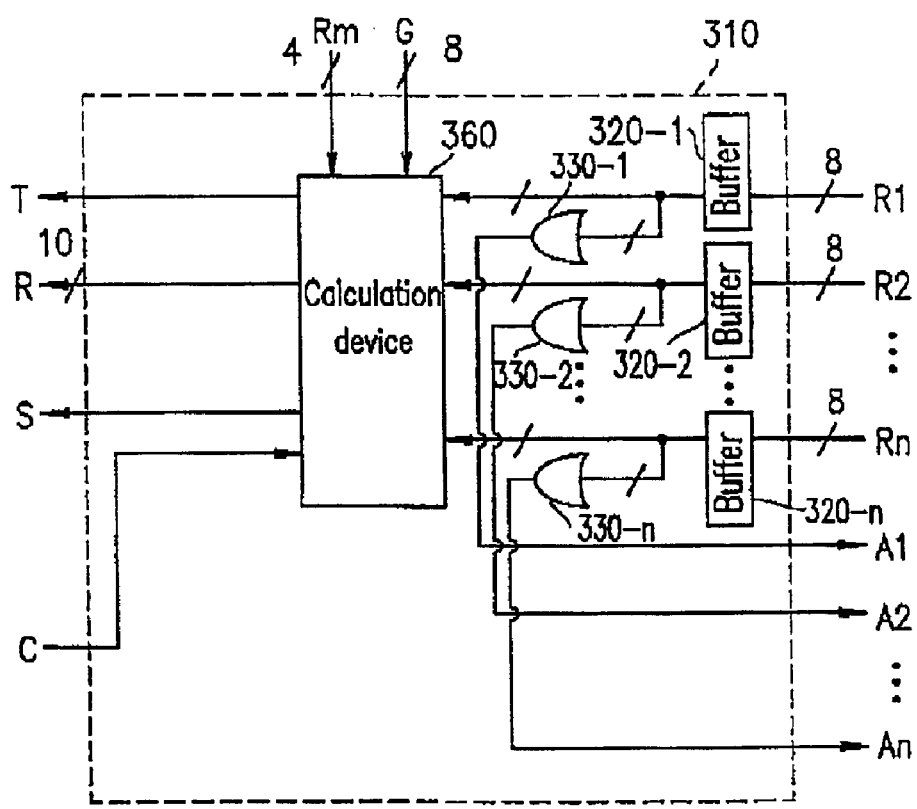
FIG. 9 is a diagram illustrating an internal structure of a power control apparatus 310 in the power supply system 3 shown in FIG. 3.

FIG. 9 shows an internal structure of the power control apparatus 310. The power control apparatus 310 includes n buffers 320-1 through 320-n, n logic OR devices 330-1 through 330-n, and a calculation device 360.

A plurality of power request signals R1 through Rn respectively output from the plurality of electric products 40-1 through 40-n are respectively stored in the buffers 320-1 through 320-n. In the example shown in FIG. 9, each of the plurality of power request signals R1 through Rn is represented by 8-bit digital data. Here, the power request signal Ri indicates the number of watts which is required to use the electric product 40-i. In the power request signal Ri indicating a "request for use", pi>0; and in the power request signal Ri indicating a "request for non-use", pi=0.

The electric product 40-i which outputs a power request signal Ri indicating a "request for non-use" is in a wait state, and thus consumes an amount of power required in the wait state of the electric product 40-i. Signal Rm, which indicates a minimum necessary amount of power for communication between the plurality of electric products 40-1 through 40-n and the power control apparatus 310 is represented by, for example, 4-bit digital data. (Hereinafter, signal Rm will be referred to as the "minimum power signal Rm"). The minimum power signal Rm is preset to have a prescribed value. The minimum power signal Rm is input to the power control apparatus 310 beforehand. The electric product 40-i requests the power control apparatus 310 to provide the "amount of power required in the wait state of the electric product 40-i" as a part of the amount of minimum power indicated by the minimum power signal Rm. Accordingly, the electric product 40-i does not need to request the power control apparatus 310 for the "amount of power required in the wait state of the electric product 40-i" separately from the minimum power signal Rm. This is why pi=0 in the power request signal Ri indicating a "request for non-use".

It is assumed that a power request signal Ri, once stored in any of the buffers 320-1 through 320-n, is not updated until the next power request signal Ri (output from the same electric product as the power request signal Ri stored in the buffer) is received by the power control apparatus 310.

The calculation device 360 receives a plurality of power request signals Ri through Rn, a minimum power signal Rm and a power generation signal G, and generates a power request signal R in accordance with expression (2).

The calculation device 360 also generates a sign signal S indicating the sign of the power request signal R.

In synchronization with the timing at which the power request signal R is output to the fuel cell 20, the calculation device 360 sets a power purchase signal T to a first level (for example, a high level) indicating a purchase of power from the power company 80 is permitted. In synchronization with the timing at which a matching signal C is received from the fuel cell 20, the calculation device 360 sets a power purchase signal T to a second level (for example, a low level) indicating the purchase of power from the power company 80 is to be stopped.

Each of a plurality of power permission signals A1 through An is generated based on an output from a corresponding one of the logic OR devices 330-1 through 330-n.

The internal structure of the power control apparatus 300 (FIG. 3) is the same as that of the internal structure of the power control apparatus 310 shown in FIG. 9 except that a power generation signal G is not input to and a sign signal S is not output from the power control apparatus 300. In the power control apparatus 300, the calculation device 360 receives a plurality of power request signals R1 through Rn and a minimum power signal Rm, and generates a power request signal R in accordance with expression (1).

Figure 10:
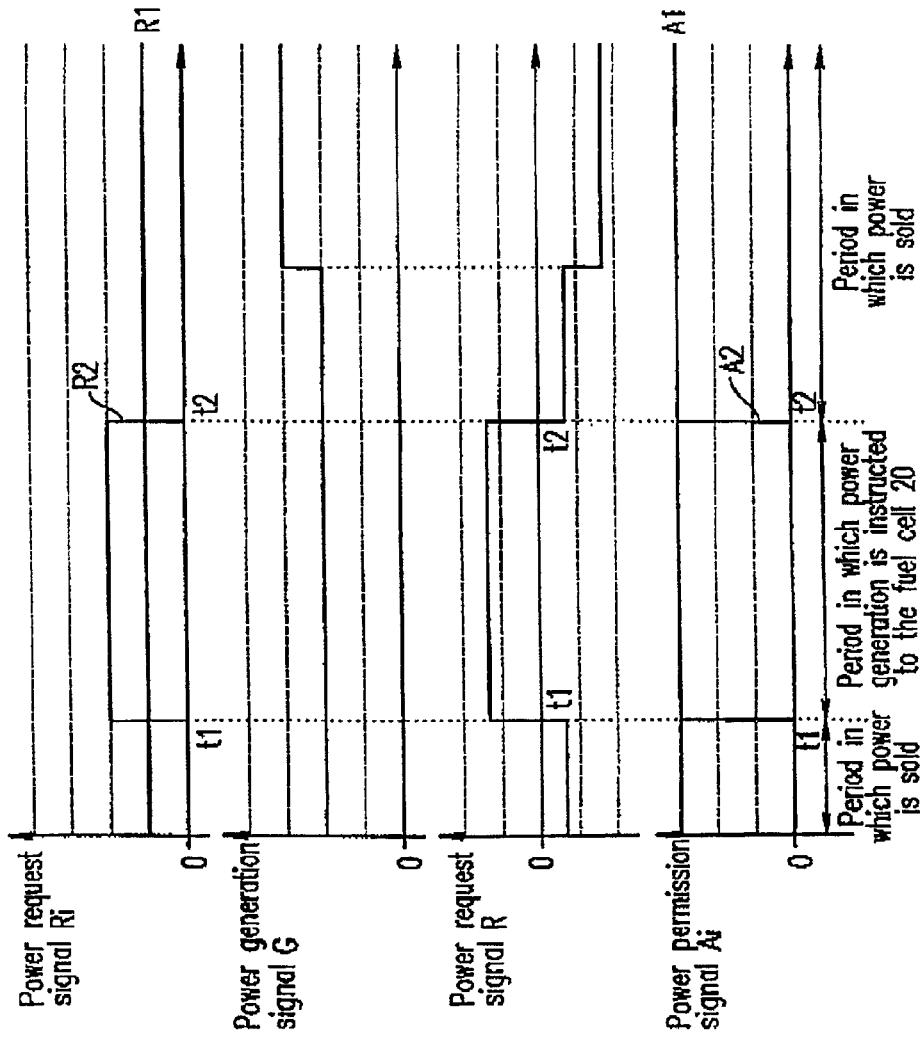
FIG. 10 is a timing diagram illustrating waveforms of various signals used in the power supply system 3 shown in FIG. 6.

FIG. 10 is a timing diagram illustrating waveforms of various signals used in the power supply apparatus 3 (FIG. 6) in the third example. In FIG. 10, R1 indicates a power request signal which is output from the refrigerator 40-1. R2 indicates a power request signal which is output from the TV 40-2. It is assumed that power generation by the solar cell 110 is performed. Accordingly, as shown in FIG. 10, the power generation signal G has a positive value.

It is assumed that at time t1, the user wants to watch the TV 40-2 and operates the switch of the TV 40-2 from off to on. In this case, the TV 40-2 outputs a power request signal R2 indicating a "request for use" (in the example shown in FIG. 10, a high level signal) to the power control apparatus 310. The power control apparatus 310 receives the power request signals R1 and R2 and minimum power signal Rm (not shown in FIG. 10, see FIG. 9) and the power generation signal G, and generates a power request signal R at time t1 in accordance with expression (2). The power control apparatus 310 determines the sign of the value of the power request signal R at time t1. In the example shown in FIG. 10, $R \geq 0$ at time t1. Accordingly, the power control apparatus 310 instructs the solar cell 20 to generate power of the amount |R| corresponding to the insufficiency, and sets the power purchase signal T to a first level (for example, a high level) indicating a purchase of power from the power company 80 is permitted. The power control apparatus 310 changes the level of a power permission signal A2 from a low level to a high level substantially simultaneously when the power request signal R2 indicating a "request for use" is received from the TV 40-2. Then, in synchronization with the receipt of a matching signal C from the fuel cell 20, the power control apparatus 310 sets the power purchase signal T to a second level (for example, a low level) indicating the purchase of the power from the power company 80 is to be stopped (during a period from time t1 to time t2).

It is assumed that at time t2, the user wants to turn off the TV 40-2 and operates the switch of the TV 40-2 from on to off. In this case, the TV 40-2 outputs a power request signal R2 indicating a "request for non-use" (in the example shown in FIG. 10, a low level signal) to the power control apparatus 310. The power control apparatus 310 receives the power request signals R1 and R2 and minimum power signal Rm (not shown in FIG. 10, see FIG. 9) and the power generation signal G, and generates a power request signal R at time t2 in accordance with expression (2). The power control apparatus 310 determines the sign of the value of the power request signal R at time t2. In the example shown in FIG. 10, $R<0$ at time t2. Accordingly, the power control apparatus 310 cancels the instruction to the solar cell 20 to generate the power, and instructs the power supply apparatus 200 to sell the excess amount of power |R| to the power company 80. The power control apparatus 310 changes the level of the power permission signal A2 from a high level to a low level substantially simultaneously when the power request signal R2 indicating a "request for non-use" is received from the TV 40-2.

In this manner, the power generation of the fuel cell 20 can be controlled in accordance with whether the power supply of the TV 40-2 is on or off.

As described above, the solar cell 110 and the fuel cell 20 are used in combination. Thus, when an amount of power generation of the fuel cell 20 is insufficient ($R \geq 0$), power supplied from the power company 80 can be purchased; and when an amount of power generation of the solar cell 110 is excessive ($R<0$), the excess amount of the power can be sold to the power company 80.

In the power supply system 3, when an amount of power generation of the solar cell 110 is excessive ($R<0$), the excessive amount of the power can be stored in a storage cell (not shown) instead of being sold to the power company 80. In this case, when an amount of power generation of the fuel cell 20 becomes insufficient, the power stored in the storage cell can be used. Alternatively, when an amount of power generation of the fuel cell 20 becomes insufficient, generation of power of an amount corresponding to the insufficiency can be instructed to the fuel cell 20, and also the power stored in the storage cell can be used until the amount of power generation of the fuel cell 20 reaches the target amount of power generation.

In the power supply system 3, the power control apparatus 310 immediately returns an acknowledging signal to an electric product 40-i which outputs a power request signal Ri indicating a "request for use" upon receiving the power request signal Ri indicating a "request for use" from the electric product 40-i, without confirming receipt of a matching signal C from the fuel cell 20. By this system, the effect provided by the power supply system 2 is also provided by the power supply system 3.

Alternatively, in the power supply system 3, the power control apparatus 310 can be structured not to return an acknowledging signal to the electric product 40-i which outputs a power request signal Ri regardless of the type of the power request signal Ri (for example, regardless of whether the power request signal Ri indicates a "request for use" or a "request for non-use"). By this system, the effect provided by the power supply system 2 is also provided by the power supply system 3.

In the first through third examples, the amount of power generated by the fuel cell 20 is controlled in accordance with the increase or decrease in the amount of power requested by the request signal Ri from the electric product 40-i. Instead, the amount of power generated by the fuel cell 20 can be controlled in accordance with a request based on the power consumption of the electric products 40-i, without a power request signal Ri being output from the electric products 40-i. For example, in a structure using the "association system", the amount of power generation of the fuel cell 20 can be changed by a result of monitoring a purchase of commercial power from the power company 80 conducted by the insufficiency of the power generated by the fuel cell 20. This system is usable since the result of monitoring shows the request based on the power consumption of an electric product.

In the second and third examples, the solar cell 110 is used as power generation means. Alternatively or additionally, the power generation by the force of wind, the force of wave of seawater, or geothermal energy can be used. These means for power generation are preferably selected in full consideration of, for example, the features and characteristics of the geographical area in which the power is generated.

For example, a power supply system according to the current invention can be structured by combining the power generation by force of wind and the power generation by the solar energy.

In the first through third examples, the fuel cell 20 is installed in a house. Instead, one fuel cell can be shared by a plurality of houses (for example, one or more villages, one or more towns, or one or more apartment houses). By sharing a high efficiency fuel cell, the total power supply efficiency can be increased.

In the first through third examples, a power request signal Ri indicates a "request for use" or a "request for non-use". A power request signal Ri can indicate one of three or more requests. For example, a power request signal Ri can indicate a "request for high output use", a "request for low output use" or a "request for non-use". A power request signal Ri indicating a "request for high output use", for example, can request the power of 100 W. A power request signal Ri indicating a "request for low output use", for example, can request the power of 50 W. A power request signal Ri indicating a "request for non-use", for example, can request the power of 0 W.

When the request is switched from a "request for non-use" to a "request for high output use" or when the request is switched from a "request for non-use" to a "request for low output use", the power control apparatus 30 can change the level of a power permission signal Ai from a low level (0) to a high level (1) after confirming receipt of a matching signal C, and the power control apparatus 300 or 310 can change the level of a power permission signal Ai from a low level (0) to a high level (1) without confirming receipt of a matching signal C. When the request is switched from a "request for low output use" to a "request for high output use", the power control apparatus 30 can first change the level of a power permission signal Ai from a high level (1) to a low level (0), and after confirming receipt of a matching signal C, can change the level of a power permission signal Ai from a low level (0) to a high level (1), and the power control apparatus 300 or 310 can first change the level of a power permission signal Ai from a high level (1) to a low level (0), and without confirming receipt of a matching signal C, can change the level of a power permission signal Ai from a low level (0) to a high level (1).

When the request is switched from a "request for high output use" to a "request for non-use" or when the request is switched from a "request for low output use" to a "request for non-use", the power control apparatus 30 (or 300 or 310) can change the level of a power permission signal Ai from a high level (1) to a low level (0) without confirming receipt of a matching signal C. When the request is switched from a "request for high output use" to a "request for low output use", the power control apparatus 30 (or 300 or 310) can maintain the high level (1) without confirming receipt of a matching signal C.

In the first through third examples, a power request signal Ri indicates the number of watts of the power required to use the electric product 40-i. Instead, a power request signal Ri can indicates a state of the electric product 40-i (power state). In this case, the power control apparatus 30 (or 300 or 310) can receive a state signal indicating a state of the electric product 40-i, as a power request signal Ri, from the electric product 40-i, and obtain an amount of power required to use the electric product 40-i in the state indicated by the state signal. For example, the power control apparatus 30 (or 300 or 310) can store, in an internal memory (not shown) thereof, a correspondence table which shows the relationship between the state signal and the amount of power required to use the electric product 40-i in the state indicated by the state signal (for example, a look-up table). In this case, the correspondence table is used to convert a state signal into an amount of power required to use the electric product 40-i in the state indicated by the state signal. Such a correspondence table is preferably prepared for each type or each system of electric products.

Example 4

Figure 11:
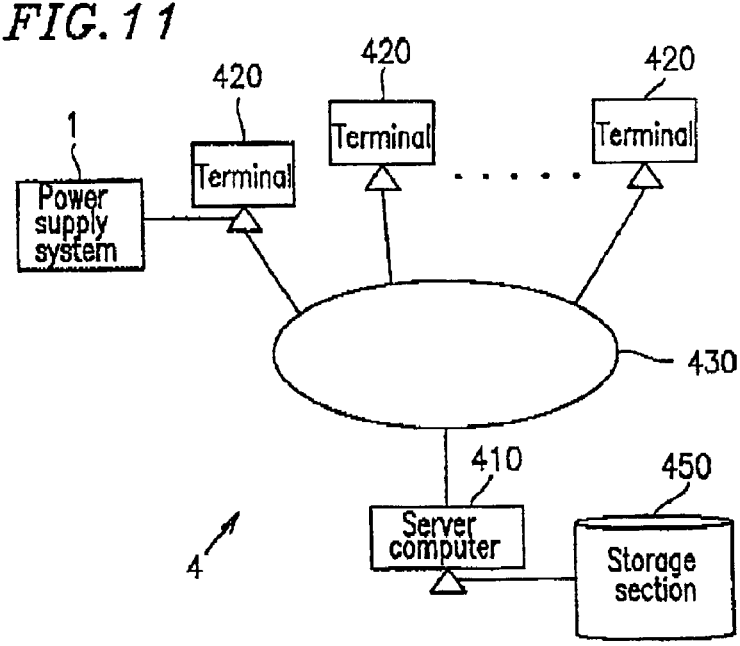
FIG. 11 is a view illustrating a structure of a computer system 4 in a fourth example according to the current invention.

FIG. 11 shows a structure of a computer system 4 in a fourth example according to the current invention. The computer system 4 includes a server computer 410 and at least one terminal 420. The server computer 410 is connected to the at least one terminal 420 through the internet 430.

The server computer 410 includes a storage section 450 for storing at least one web page. The storage section 450 is, for example, a hard disk.

FIGS. 12A and 12B each show a correspondence table indicating the relationship between the state of an electric product and the power consumption of the electric product in that state, as an example of the content of the web page stored in the storage section 450 of the server computer 410. FIG. 12A shows a correspondence table 510 for a TV having a BS recording function, and FIG. 12B shows a correspondence table 520 for a washing machine. Each of the correspondence tables 510 and 520 is, for example, a look-up table.

The correspondence table 510 in FIG. 12A shows that the TV having a BS recording function can be in one of three states (power states) of "on state", "off state" and "BS recording state". The correspondence table 510 also shows that the power consumption for the "on state" is 220 W, the power consumption for the "off state" is 0 W, and the power consumption for the "BS recording state" is 18 W. The correspondence table 510 further shows that the three states are respectively indicated by three state signals S1, S2 and S3. The state signals S1, S2 and S3 are each represented by, for example, 2-bit digital data.

The correspondence table 520 in FIG. 12B shows that the washing machine can be in one of three states (power states) of "washing by a centrifugal force", "washing by stirring" and "off state". The correspondence table 520 also shows that the power consumption for the "washing by a centrifugal force" is 170 W, the power consumption for the "washing by stirring" is 270 W, and the power consumption for the "off state" is 0 W. The correspondence table 520 further shows that the three states are respectively indicated by three state signals T1, T2 and T3. The state signals T1, T2 and T3 are each represented by, for example, 2-bit digital data.

Such a correspondence table is preferably prepared for each type or each system of electric products.

When the user demands to display the web page stored in the storage section 450 in the server computer 410 on the screen of the terminal 420, the user inputs an address exclusively specifying the web page to the terminal 420. An address exclusively specifying one particular web page is referred to as a URL (uniform resource locator) address. The terminal 420 sends the URL address which is input by the user to the server computer 410. The server computer 410 sends the content of the web page designated by the URL address to the terminal 420. The terminal 420 executes browsing. This way, the content of the web page sent to the terminal 420 from the server computer 410 is interpreted and displayed on the screen of the terminal 420.

FIG. 13A shows an example of a home page (i.e., the top page of the web page) of a "web site for the electric products usable for the power supply system". When the user clicks "search for a correspondence table", a "search for correspondence table" web page for allowing the user to input conditions for searching for a correspondence table is displayed on the screen of the terminal 420.

FIG. 13B shows an example of the "search for correspondence table" web page. When the user inputs the name of the manufacturer (for example, "Matsushita Electric Industrial Co., Ltd."), the type of the electric product (for example, "washing machine") and the item number or the model name of the electric product (for example, "XXXX") and clicks "search", a "confirm the correspondence table" web page is displayed on the screen of the terminal 420. The "confirm the correspondence table" web page allows the user to confirm the correspondence table specified by the name of the manufacturer, the type of the electric product, and the item number or the model name of the electric product input by the user.

FIG. 13C is an example of the "confirm the correspondence table" web page. When the user clicks "download", the content of the "confirm the correspondence table" web page (i.e., the correspondence table specified by the name of the manufacturer, the type of the electric product, and the item number or the model name of the electric product input by the user) is downloaded to the terminal 420 from the server computer 410 through the internet 430. Such downloading is achieved by cooperation of the download programs installed in both of the server computer 410 and the terminal 420 beforehand.

When there is no need to confirm the search result of the correspondence table, the display of the "confirm the correspondence table" web page shown in FIG. 13C can be omitted. In this case, the search result (i.e., the correspondence table specified by the name of the manufacturer, the type of the electric product, and the item number or the model name of the electric product input by the user) can be downloaded to the terminal 420 from the server computer 410 through the internet 430.

The terminal 420 is connected to the power supply system 1 (FIG. 1). The power control apparatus 30 in the power supply system 1 includes a memory (not shown) therein for storing a correspondence table. In this structure, the correspondence table downloaded from the server computer 410 can be stored in the memory in the power control apparatus 30. The power control apparatus 30 receives a state signal indicating a state (power state) of an electric product 40-i and converts the state into a power consumption of the electric product 40-i in the state indicated by the state signal, using the correspondence table stored in the power control apparatus 30.

Alternatively, when the power control apparatus 30 acts as a home server, the correspondence table can be downloaded from the server computer 410 to the power control apparatus 30 without via the terminal 420.

In this manner, the correspondence table downloaded from the server computer 410 can be used in the power control apparatus 30. Thus, in the case where an electric product connected to the power control apparatus 30 is replaced with another electric product or an electric product is additionally connected to the power control apparatus 30, the power supply system 1 can easily be conformed to the new environment of use without any work of the user.

When an electric product is sold to a user, a URL address for obtaining a correspondence table regarding the electric product can be attached to the electric product. For example, such a URL address can be described in the warranty or service specifications (user's manual) packaged with the electric product. The user can easily obtain the correspondence table regarding the electric product purchased by accessing the web page designated by the URL address. Consequently, the user can easily add the electric product to the power supply system 1.

The terminal 420 can be connected to the power supply system 2 (FIG. 3) or the power supply system 3 (FIG. 6) instead of the power supply system 1 (FIG. 1).

In the fourth example, the internet 430 is used. Any type of network is usable instead of or in combination with the internet 430.

According to the current invention, a second power request signal as a counting result of a plurality of first power request signals from a plurality of electric products is output to a power generation apparatus. An amount of power generated by the power generation apparatus is controlled by the second power request signal. By such a system, the power generation apparatus can be controlled to generate a "necessary amount" of power "when necessary" in response to a request from the electric products. As a result, the amount of power generated by the power generation apparatus is not unnecessarily increased, which achieves energy savings.

According to the current invention, in response to a matching signal, an acknowledging signal is output to each of at least one electric product which outputs a first power request signal among the plurality of electric products. The at least one electric product which outputs the first power request signal starts operating after receiving the acknowledging signal from the power control apparatus. This guarantees that the electric product performs an operation under conditions which are necessary for the electric product to realize a prescribed function without fail (rated conditions); namely, this guarantees that the electric product performs a rated operation. As a result, the frequency of the electric product malfunctioning is significantly reduced.

According to the current invention, the power control apparatus controls a power supply apparatus to compensate for the insufficiency in the power generated by the power generation apparatus with power supplied from a power supply source other than the power generation apparatus until the amount of power generated by the power generation apparatus is confirmed to reach the target amount of power generation (i.e., a period from when a current power request signal is output to the power generation apparatus until a matching signal is received from the power generation apparatus). This way, the power control apparatus can return an acknowledging signal at real time to the electric product which outputs a power request signal without waiting until the amount of power generated by the power generation apparatus reaches the target amount of power generation. As a result, the user is prevented from experiencing the discomfort of delayed start of the operation of the electric product.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A power supply system, comprising:
   a plurality of electric products;
   a power generation apparatus capable of varying an amount of power generation; and
   a power control apparatus for controlling power supply from the power generation apparatus to the plurality of electric products,
   wherein:
   each of the plurality of electric products is structured to be capable of outputting a first power request signal for requesting a desired amount of power,
   the power control apparatus receives the plurality of first power request signals respectively from the plurality of electric products, generates a second power request signal for requesting an amount of power which is determined in accordance with a total amount of power requested by the plurality of first power request signals, and outputs the second power request signal to the power generation apparatus, and
   the power generation apparatus increases or decreases the amount of power generation so as to match the amount of power generation with a target amount of power generation which is determined in accordance with the second power request signal.

2. A power supply system according to claim 1, wherein the power generation apparatus is a fuel cell.

3. A power supply system according to claim 1, wherein the power control apparatus generates the second power request signal so as to fulfill $R=\Sigma Ri+Rm$, where R indicates an amount of power requested by the second power request signal, Ri (i=0, 1, . . . n) indicates an amount of power requested by each of the plurality of first power request signals, and Rm indicates a minimum necessary amount of power for communication between the plurality of electric products and the power control apparatus.

4. A power supply system according to claim 1, wherein:
   the power generation apparatus determines whether or not the amount of power generation matches the target amount of power generation which is determined in accordance with the second power request signal; and when the amount of power generation is determined to match the target amount of power generation, the power generation apparatus outputs a matching signal to the power control apparatus, and
   the power control apparatus outputs an acknowledging signal to each of at least one electric product which outputs the first power request signal among the plurality of electric products, in response to the matching signal.

5. A power supply system according to claim 1, wherein:
   the power generation apparatus determines whether or not the amount of power generation matches the target amount of power generation which is determined in accordance with the second power request signal, and
   when the amount of power generation is determined to match the target amount of power generation, the power generation apparatus outputs an acknowledging signal to each of at least one electric product which outputs the first power request signal among the plurality of electric products.

6. A power supply system according to claim 1, further comprising a power supply apparatus for outputting at least one of power supplied from the power generation apparatus and power supplied from a power supply source other than the power generation apparatus,
   wherein the power generation apparatus determines whether or not the amount of power generation matches the target amount of power generation which is determined in accordance with the second power request signal: and when the amount of power generation is determined to match the target amount of power generation, the power generation apparatus outputs a matching signal to the power control apparatus, and
   the power control apparatus determines whether or not an amount of power requested by a current second power request signal is increased as compared with an amount of power requested by a previous second power request signal; and when it is determined that the amount of power requested by the current second power request signal is increased as compared with the amount of power requested by the previous second power request signal, the power control apparatus controls the power supply apparatus to compensate for an insufficiency in the power supplied from the power generation apparatus with power supplied from the power supply source, during a period from when the current second power request signal is output to the power generation apparatus until when the matching signal is received from the power generation apparatus.

7. A power supply system according to claim 6, wherein the power control apparatus controls the power supply apparatus to compensate for the insufficiency in the power supplied from the power generation apparatus with power supplied from the power supply source only when the increase of the amount of power requested by the current second power request signal over the amount of power requested by the previous second power request signal is equal to or more than a prescribed value.

8. A power supply system according to claim 6, wherein the power supply source supplies commercial power.

9. A power supply system according to claim 6, wherein the power supply source is a storage cell.

10. A power supply system according to claim 1, wherein the plurality of electric products are connected to the power control apparatus via a wireless system or a wired system.

11. A power supply system according to claim 1, wherein the first power request signal is a state signal indicating a state of the electric product; and the power control apparatus obtains an amount of power required by the electric product in the state which is indicated by the state signal, and generates the second power request signal based on the amount of power required by the electric product.

12. A computer system comprising a server computer and a terminal, wherein:

the server computer includes a storage section for storing a correspondence table indicating a relationship between a state of an electric product and power consumption of the electric product in the state, and the correspondence table is downloaded from the server computer through a network in accordance with a request from the terminal;

wherein:

the terminal is connected to a power supply system, the power supply system includes a plurality of electric products, a power generation apparatus capable of varying an amount of power generation, and a power control apparatus for controlling power supply from the power generation apparatus to the plurality of electric products, and the power control apparatus outputs a power request signal to the power generation apparatus, and the downloaded correspondence table is stored in the power control apparatus.

13. A power supply system according to claim 1, wherein the power supply system is a system for supplying power to at least one of a home and an office.

* * * * *